(12) United States Patent
Chou

(10) Patent No.: US 7,817,189 B2
(45) Date of Patent: Oct. 19, 2010

(54) GAIN-COEFFICIENT ACQUIRING DEVICE AND IMAGE PROCESSING DEVICE HAVING SAME

(75) Inventor: Tsun-Hou Chou, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 358 days.

(21) Appl. No.: 12/131,130

(22) Filed: Jun. 2, 2008

(65) Prior Publication Data

US 2009/0190010 A1 Jul. 30, 2009

(30) Foreign Application Priority Data

Jan. 28, 2008 (CN) .................. 2008 1 0300242

(51) Int. Cl.
*H04N 5/235* (2006.01)
*H04N 9/64* (2006.01)

(52) U.S. Cl. ................. 348/229.1; 348/230.1; 348/243; 348/251

(58) Field of Classification Search .............. 348/229.1, 348/230.1, 251, 243
See application file for complete search history.

(56) References Cited

U.S. PATENT DOCUMENTS 6,750,910 B1 6/2004 Bilhan

2005/0073597 A1* 4/2005 Rengakuji et al. ........... 348/241
2006/0007331 A1* 1/2006 Izumi et al. ................. 348/246
2006/0227227 A1* 10/2006 Tsuruoka .................... 348/241

FOREIGN PATENT DOCUMENTS

CN        1717006 A       1/2006

* cited by examiner

*Primary Examiner*—David L Ometz
*Assistant Examiner*—Quang V Le
(74) *Attorney, Agent, or Firm*—Zhigang Ma

(57) ABSTRACT

An image processing device includes an initialization module, an optical black detection module, a calculation module, an image capturing module, a gain-value acquiring module, a gain adjusting module, and a pixel value adjusting module. The calculation module is configured for calculating the gain-coefficient. The image capturing module is configured for capturing an image of an object and acquiring the pixel value of each pixel of the image. The gain-value acquiring module is configured for acquiring a gain value according to the pixel values of the image. The gain adjusting module is configured for multiplying the gain value by the gain-coefficient to obtain an adjusted-gain value. The pixel value adjusting module is configured for multiplying the pixel values by the adjusted-gain value to adjust the pixel values.

9 Claims, 5 Drawing Sheets

GAIN-COEFFICIENT ACQUIRING DEVICE AND IMAGE PROCESSING DEVICE HAVING SAME

BACKGROUND

1. Field of the Invention

The present invention relates to image processing devices, and, in particular, to an image processing device having a gain-coefficient acquiring device for adjusting the brightness of the captured image.

2. Description of Related Art

Conventionally, a solid-state image sensor, such as a CCD image sensor, or a CMOS image sensor, includes an effective pixel area and an optical black area surrounding the effective pixel area. When the image of an object picked up by the image sensor is to be reproduced from image data representative of the image, a black level is corrected by use of data output from the optical black area. However, in making correction, a plurality of optical black areas must be arranged above and below the effective pixel area in the imaging plane. Consequently, it is difficult to further enhance image quality in a high-sensitivity pickup mode, a long-exposure pickup-mode or other similar image pickup modes.

It is desired to provide an image processing device having a gain-coefficient acquiring device, which can overcome the above-described deficiency.

SUMMARY

In accordance with the present invention, an image processing device includes an initialization module, an optical black detection module, a calculation module, an image capturing module, a gain-value acquiring module, a gain adjusting module, and a pixel value adjusting module. The initialization module is configured for initializing a base of the pixel value. The optical-black detection module is configured for detecting the optical-black area of the image sensor to obtain an optical black value of the image sensor. The calculation module is configured for calculating the gain-coefficient using a equation:

$$K = \frac{2^n - 1}{2^n - 1 - S}.$$

The image capturing module is configured for capturing an image of an object and acquiring a pixel value of each pixel of the image. The gain-value acquiring module is configured for acquiring a gain value according to the pixel value of the image. The gain adjusting module is configured for multiplying the gain value by the gain-coefficient to an adjusted-gain value. The pixel adjusting module is configured for adjusting the pixel value of the image according to the adjusted-gain value.

Other novel features and advantages will become more apparent from the following detailed description when taken in conjunction with the accompanying drawings.

Other advantages and novel features of the present invention will become more apparent from the following detailed description of an embodiment/embodiments when taken in conjunction with the accompanying drawings, in which:

DETAILED DESCRIPTION

Figure 1:
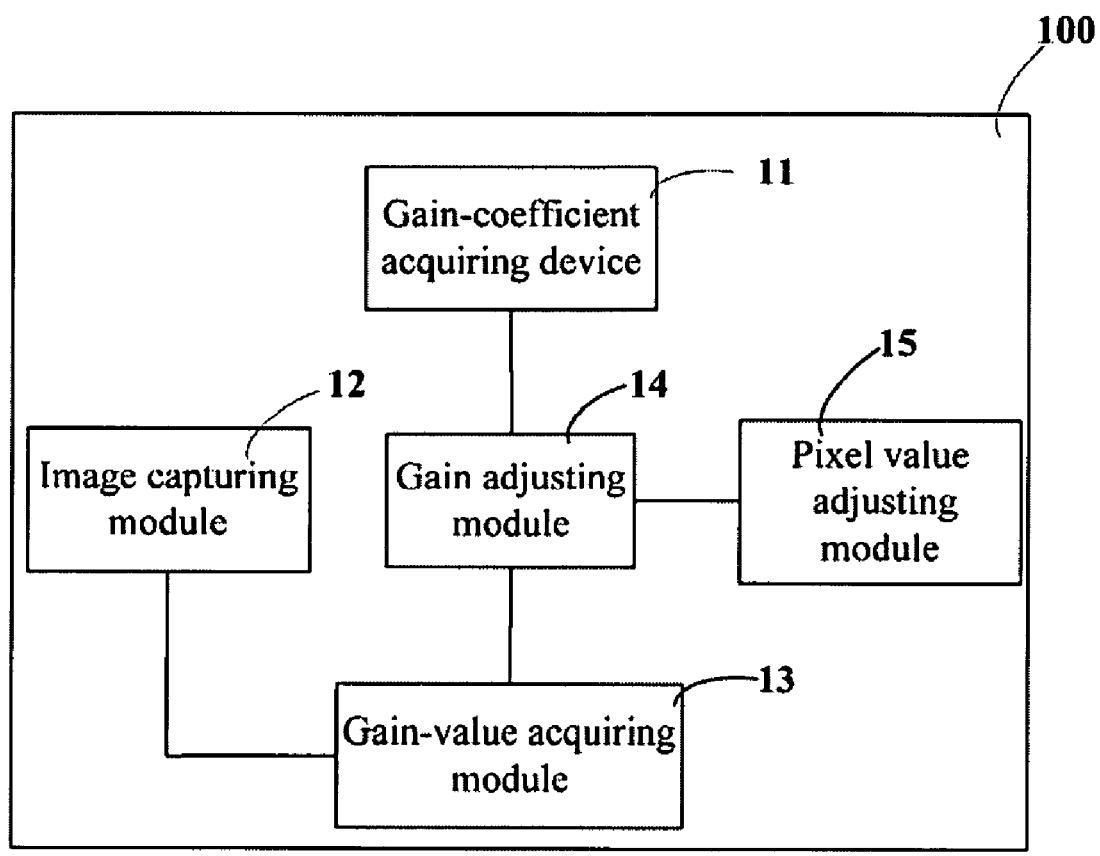
FIG. 1 is a block diagram of an image processing device according to an exemplary embodiment.

Referring to FIG. 1, an image processing device 100 according to the exemplary embodiment of the present embodiment is shown. The image processing device 100 includes a gain-coefficient acquiring device 11, an image capturing module 12, a gain-value acquiring module 13, a gain adjusting module 14, and a pixel value adjusting module 15.

Figure 2:
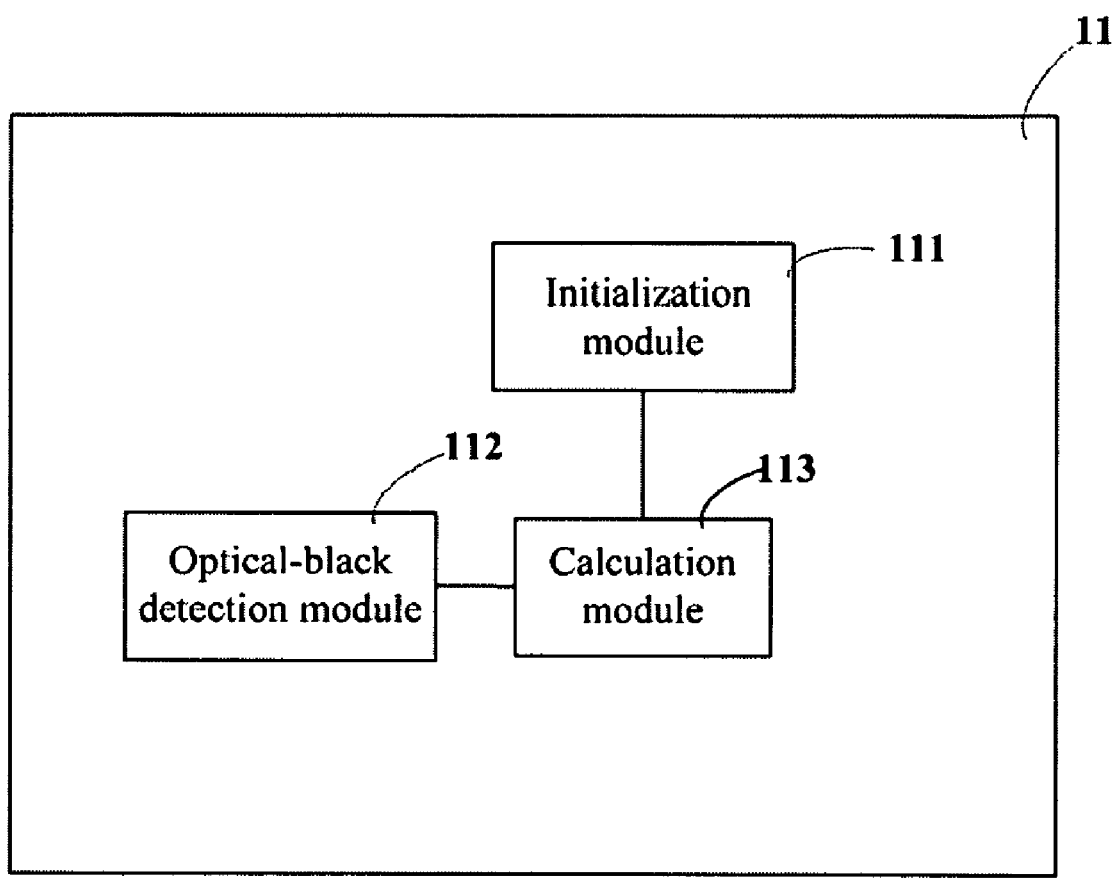
FIG. 2 is a block diagram of a gain-coefficient acquiring device of the image processing device of FIG. 1.

The gain-coefficient acquiring device 11 is configured for acquiring a gain-coefficient to adjust a pixel value of an image captured by the image capturing module 12. Referring to FIG. 2, the gain-coefficient acquiring device 11 includes an initialization module 111, an optical-black detection module 112, and a calculation module 113.

The initialization module 111 is configured for initializing a base of the pixel value. The base is applied to represent numbers that are expressed, for example, using ten digit symbols 0 through 9 in a base-10 system, or eight digit symbols up to 7 in a base-8 system, or only two digit symbols 0 and 1 in a base-2 system. In the present embodiment, the base is 2. For example, when the pixel value of the captured image is 255, it may be denoted and recorded in a memory unit (not shown) as $2^8-1$. According to the pixel value of the captured image, it can be denoted as $2^n-1$, wherein n represents the power value.

The optical-black detection module 112 is configured for detecting the image capturing module 12 to obtain an optical black value of it.

The calculation module 113 is configured for obtaining the gain-coefficient according to the base and the optical black value. The calculation module 113 calculates the gain-coefficient using the following equation:

$$K = \frac{2^n - 1}{2^n - 1 - S}$$

wherein:

K represents the coefficient value;

n represents the base; and

S represents the optical black value.

The equation is an empirical equation and obtained in the course of manufacturing and correcting the image capturing device, such as a CCD image sensor, a CMOS image sensor, and so on.

The image capturing module 12 can be a camera module and is configured for capturing an image of an object (not shown), acquiring the pixel value of each pixel of the image, and sending it to the gain-value acquiring module 13. Conventionally, each pixel value of the captured image is the total of the resultant values of a red channel value, a green channel value, and a blue channel value. In the present embodiment, only one channel value, such as red channel value, is presented as an example to explain working principle of the image processing device.

The gain-value acquiring module 13 is configured for acquiring a gain value according to the acquired pixel value of the image. In the present embodiment, the gain-value acquiring module 13 converts the pixel value of the image into three-dimensional perceptual color space data first, then creates a histogram of chromaticity vectors corresponding to the pixel values of the image and identifies a neutral core peak from the histogram. At last, the gain-value acquiring module 13 compares the neutral core peak with reference vectors (which have been initialized) to obtain color channel amplifying gain values.

The gain adjusting module 14 is configured for multiplying the gain value obtained by the gain-value acquiring module 13 by the gain-coefficient acquired by the gain-coefficient acquiring module 11 for obtaining an adjusted-gain value.

The pixel value adjusting module 15 is configured for adjusting the pixel value of the captured image according to the adjusted-gain value obtained by the gain adjusting module 14. In the present embodiment, the pixel value is adjusted by multiplying the pixel value by the adjusted-gain value.

Figure 3:
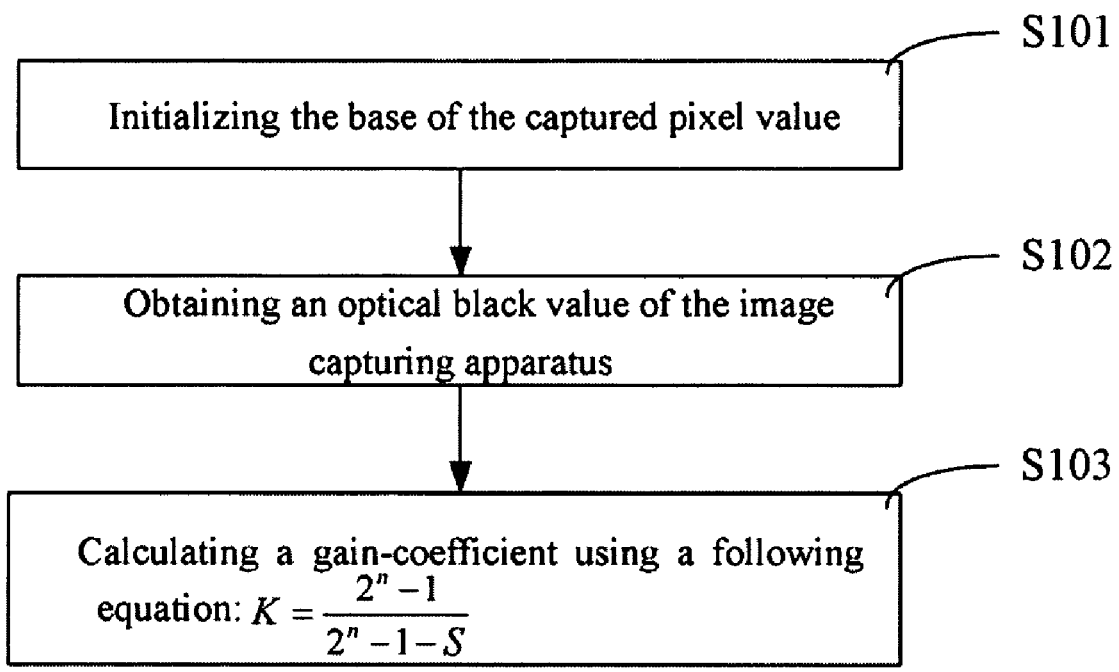
FIG. 3 is a flow chart of an exemplary method for acquiring a gain-coefficient utilizing the gain-coefficient acquiring device of FIG. 1.

Referring to FIG. 3, a flow chat of an exemplary method for acquiring a gain-coefficient is shown. The method includes:

step S101: initializing the base of the captured pixel value;

step S102: obtaining an optical black value of the image capturing module 12; and step S103: calculating a gain-coefficient using a following equation:

$$K = \frac{2^n - 1}{2^n - 1 - S}$$

Figure 4:
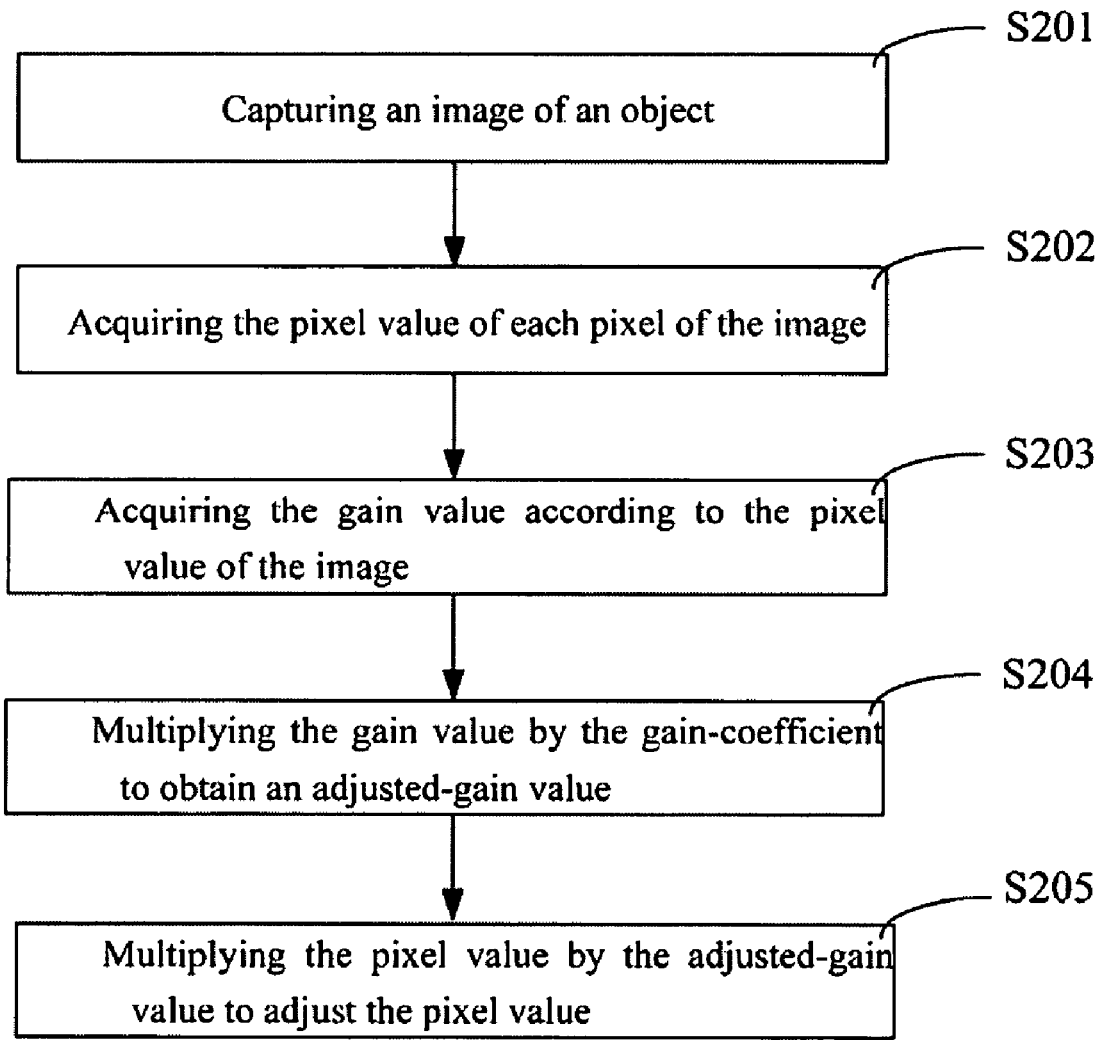
FIG. 4 is a flow chart of an exemplary method for adjusting a pixel value of an image utilizing the image processing device of FIG. 2.

Referring to FIG. 4, a flow chart of an exemplary method for adjusting pixel values of the captured image is shown. The method includes:

step S201: capturing an image of an object;

step S202: acquiring the pixel value of each pixel of the image;

step S203: acquiring the gain value according to the pixel value of the image;

step S204: multiplying the gain value by the gain-coefficient to obtain an adjusted-gain value; and step S205: multiplying the pixel value by the adjusted-gain value to adjust the pixel value.

Figure 5:
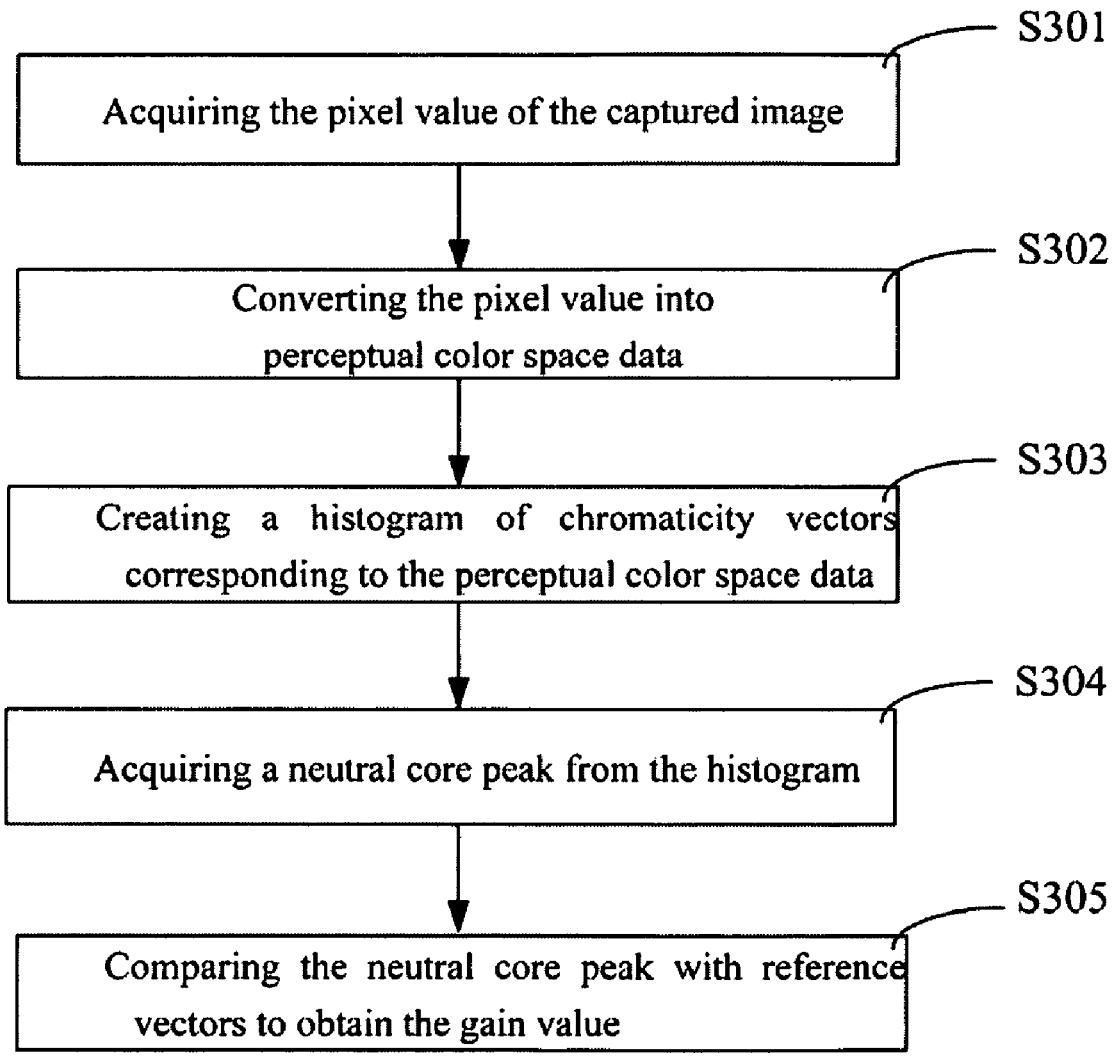
FIG. 5 is a flow chart of an exemplary method for obtaining a gain value utilizing a white balance adjusting module.

In step S203, the gain value is acquiring by a white balance adjusting module using the following method as shown in FIG. 5. The method includes:

step S301: acquiring the pixel value of the captured image;

step S302: converting the pixel value into perceptual color space data;

step S303: creating a histogram of chromaticity vectors corresponding to said perceptual color space data;

step S304: acquiring a neutral core peak from the histogram; and step S305: comparing the neutral core peak with reference vectors to obtain the gain value.

As described above, when correcting the pixel values of an image, a plurality of optical black areas must not be arranged above and below the effective pixel area in the imaging plane, the gain-coefficient value can be obtained according to the optical black value utilizing the empirical equation:

$$K = \frac{2^n - 1}{2^n - 1 - S}.$$

Accordingly, the pixel values of an image can be adjusted by using the gain-coefficient value and the gain value render the image with improved quality.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A gain-coefficient acquiring device for acquiring a gain-coefficient to adjust a pixel value of an image captured by an image sensor, comprising:

an initialization module configured for initializing a base of the pixel value;

an optical-black detection module configured for detecting a optical-black area of the image sensor to obtain an optical black value of the image sensor; and a calculation module configured for obtaining the gain-coefficient according to the base and the optical black value, wherein the calculation module calculates the gain-coefficient using the following equation:

$$K = \frac{2^n - 1}{2^n - 1 - S}$$

wherein:

K represents the coefficient value;

n represents the base;

S represents the optical black value.

2. The gain-coefficient acquiring device as claimed in claim 1, wherein the base of the pixel value is 2.

3. An image processing device for adjusting a pixel value of an image captured by an image sensor, comprising:

an initialization module configured for initializing a base of the pixel value;

an optical-black detection module configured for detecting the image sensor to obtain an optical black value of the image sensor;

a calculation module configured for calculating the gain-coefficient using a following equation:

$$K = \frac{2^n - 1}{2^n - 1 - S}$$

wherein:

K represents the coefficient value;

n represents the base;

S represents the optical black value;

an image capturing module configured for capturing an image of an object and acquiring the pixel value of each pixel of the image;

a gain-value acquiring module configured for acquiring a gain value according to the pixel value of the image;

a gain adjusting module configured for multiplying the gain value by the gain-coefficient to obtain an adjusted-gain value; and a pixel value adjusting module configured for adjusting the pixel value of the image according to the adjusted-gain value.

4. The image processing device as claimed in claim 3, wherein the pixel values of the image includes red channel value, green channel value, and blue channel value.

5. The image processing device as claimed in claim 3, wherein the base of the pixel value is 2.

6. A method for acquiring a gain-coefficient, comprising:
   initializing the base of the pixel value;
   obtaining an optical black value of the image sensor; and
   calculating a gain-coefficient using a following equation:

$$K = \frac{2^n - 1}{2^n - 1 - S}$$

wherein:
   K represents the coefficient value;
   n represents the base; and
   S represents the optical black value.

7. The method as claimed in claim 6, wherein the base of the pixel value is 2.

8. A method for adjusting a pixel value of an image captured by an image sensor, comprising:
   initializing a base of the pixel value;
   detecting the image sensor to obtain an optical black value of the image sensor;
   calculating the gain-coefficient using a following equation:

$$K = \frac{2^n - 1}{2^n - 1 - S}$$

wherein:
   K represents the coefficient value;
   n represents the base; and
   S represents the optical black value;
   capturing an image of an object;
   acquiring a pixel value of each pixel of the image;
   acquiring a gain value according to the pixel value of the image;
   multiplying the gain value by the gain-coefficient to an adjusted-gain value; and
   multiplying the pixel value by the adjusted-gain value to adjust the pixel value.

9. The method as claimed in claim 8, wherein the base of the pixel value is 2.

* * * * *